United States Patent [19]

Pool

[11] Patent Number: 4,733,450

[45] Date of Patent: Mar. 29, 1988

[54] FRONT WHEEL AXLE PULLER

[75] Inventor: James L. Pool, Clarinda, Iowa

[73] Assignee: Lisle Corporation, Clarinda, Iowa

[21] Appl. No.: 899,248

[22] Filed: Aug. 22, 1986

[51] Int. Cl.[4] .............................................. B23P 19/04

[52] U.S. Cl. ......................................... 29/254; 29/275

[58] Field of Search ................. 29/254, 275, 263, 280, 29/281.1, 282, 283, 259; 254/29 R

[56] References Cited

U.S. PATENT DOCUMENTS

| | | | |
|---|---|---|---|
| 1,583,409 | 5/1926 | Marquart | 254/29 R |
| 2,044,483 | 6/1936 | Neher | 254/29 R |
| 2,654,569 | 10/1953 | Cooper | 254/29 R |
| 3,280,455 | 10/1966 | Smith | 29/254 |
| 4,283,827 | 8/1981 | Abel | 29/254 |
| 4,463,489 | 8/1984 | James | 29/259 |

*Primary Examiner*—Robert C. Watson

*Attorney, Agent, or Firm*—Allegretti, Newitt, Witcoff & McAndrews, Ltd.

[57] ABSTRACT

A front wheel axle pulling tool includes a clamp secured to a flexible cable and a slider hammer secured to the flexible cable by a slide nut.

9 Claims, 5 Drawing Figures

FRONT WHEEL AXLE PULLER

BACKGROUND OF THE INVENTION

This invention relates to a tool for pulling axes from vehicles. More specifically, this invention relates to a tool for pulling an axle assembly from a transaxle case on front wheel drive vehicles.

In front wheel drive vehicles, the engine drives a transaxle spanning between the two front wheels. The transaxle, in turn, drives an axle assembly at each end, and the axle assemblies then drive the front wheels. The transaxle is not directly connected to the wheels because the wheels must be steerable. Thus, two axle assemblies, one at each end of the transaxle, are connected to the transaxle via a special joint known as a constant velocity or "CV" joint. The CV joint is a fairly complicated assembly of drive shaft, cage, race bearings, ball bearings, and lubricant. It must work smoothly and with minimum friction.

Occasionally, the CV joint and the wheel axle must be removed from the transaxle of the vehicle for repair of maintenance. Heretofore, removal of the CV joint and wheel axle has been no easy task because the CV joint is located in an area which has limited access. That is, access space is severaly limited between the axle assembly and the transaxle for positioning tools to separate the assembly from the transaxle.

One special prior art tool for removing axle assemblies is known as the axle removing rod. The rod has a C-ring affixed at one end and a slide hammer at the other. The C-ring is positioned transverse to the rod, so that an operator can approach the axle assembly from a side of the vehicle and use the rod to reach around the assembly and position the C-ring over the axle on the side of the assembly opposite the operator. While holding the C-ring in place against one side of the axle assembly, the operator rams the slide hammer against the end of the rod opposite the C-ring. The rod transmits the force of the slide hammer to the C-ring and, thus, to the axle assembly to jar the assembly loose and separate the assembly from the transaxle.

There are several problems with such a prior art tool. First, it requires the operator to hold the rod with one hand so that the C-ring firmly abuts the axle assembly while simultaneously operating the slide hammer with the other hand. Second, the many parts block direct access to the area between the transaxle and axle assembly. Third, such tools are bulky and relatively expensive. Fourth, they cannot be packaged for display on the more popular types of tool display boards, which are designed for much smaller tools. Fifth, because the sizes of CV joints vary and yet each axle removing rod has only one size of C-clamp, each such tool is usable to remove only one size of CV joint.

Thus, it is an object of the present invention to provide a tool for removing axle assemblies from front wheel drive vehicles that is inexpensive, less bulky, and capable of being packaged in relatively small packaging.

It is another object of the present invention to provide such a tool that does not require the operator to manually hold an axle clamp, such as a C-clamp, in place on the axle while using the tool.

Yet another object is to provide such a tool that allows the operator to approach the axle assembly from an easily accessible area, such as under the vehicle, and then move to the side of the car to exert force on the tool.

A further object is to provide such a tool that allows removal of the axle without requiring direct access for a rigid rod between the side of the car and axle assembly.

An additional object is to provide a single axle assembly removing tool that is usable to remove axle assemblies on differing sizes of CV joints.

There are other objects and advantages of the present invention. They will become apparent below.

SUMMARY OF THE INVENTION

Briefly, the improved axle puller for pulling an axle assembly from a transaxle case on front wheel drive vehicles has a flexible cable, a means for clamping the axle assembly, a means for attaching the flexible cable to the clamping means, and means for tensioning the cable. Tensioning the cable transmits pulling force from the cable to the clamping means, and, in turn, from the clamping means to the axle assembly, thereby separating the axle assembly from the transaxle case with very little difficulty or effort.

DESCRIPTION OF THE DRAWINGS

The preferred embodiment of the present invention is illustrated in the accompanying drawings wherein.

DETAILED DESCRIPTION OF THE PREFERRED EMBODIMENT

Figure 1:
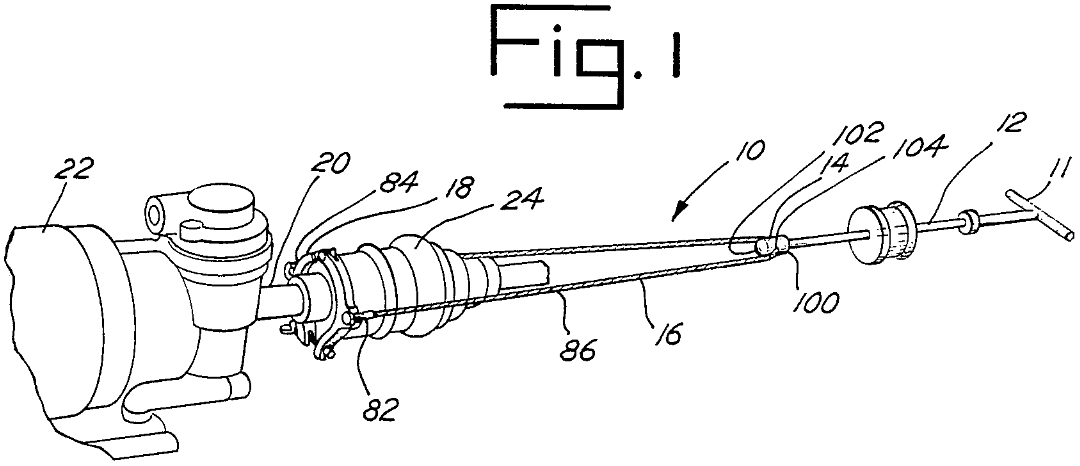
FIG. 1 is a perspective view of the preferred embodiment when mounted about the axle assembly to remove the assembly from the transaxle case.

Referring to FIG. 1, the preferred embodiment of the improved axle puller 10 consists of a slide hammer 12 secured to a slide nut 14, which slides on a flexible cable 16 attached at each end to an adjustable clamp jaw 18. The clamp jaw 18 is mounted about an axle 20 between a transaxle case 22 and an axle assembly 24. The clamp jaw 18 abuts the axle assembly 24 so that ramming the slide hammer 12 away from the axle assembly 24 transmits pulling force from the cable 16 through the clamp jaw 18 to the axle assembly 24. The axle assembly 24 is thus separated from the transaxle case 22.

Figure 2:
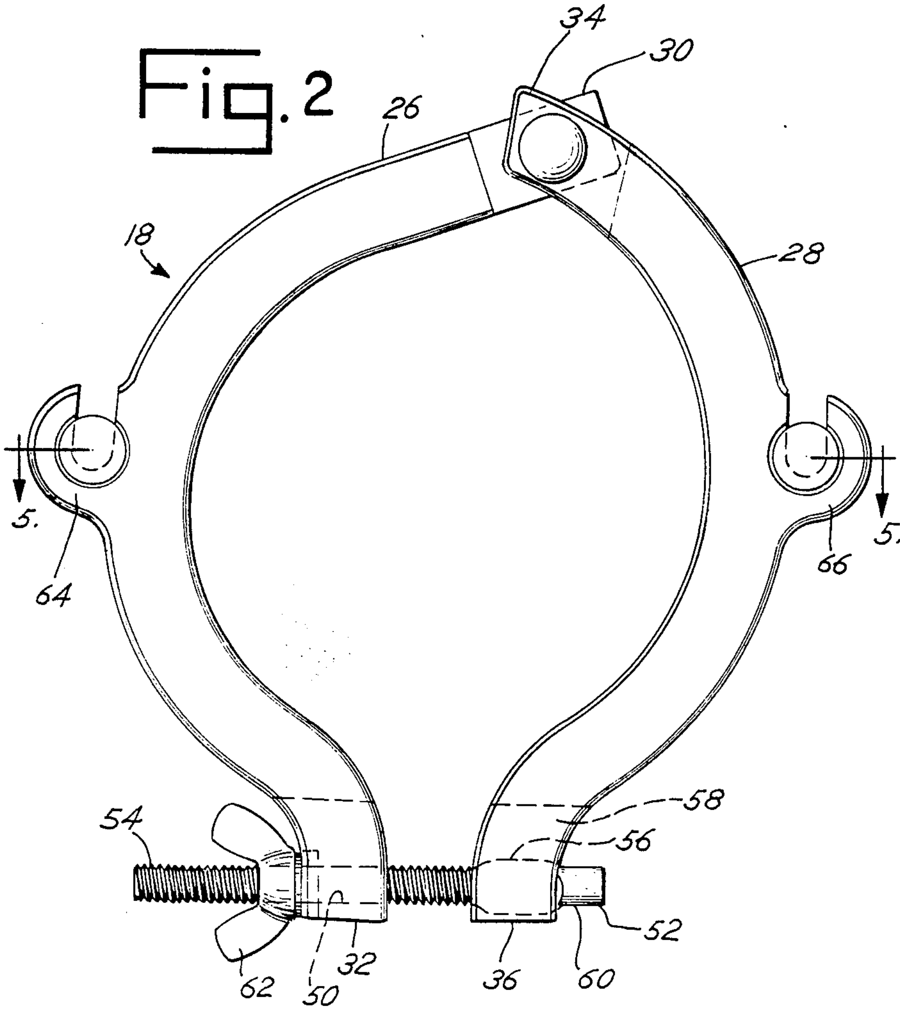
FIG. 2 is a plan view of the axle clamp of the preferred embodiment.

Referring now to FIG. 2, the clamp jaw 18 has a first arcuate section 26 and a second arcuate section 28. The first arcuate section 26 has a radius of curvature slightly smaller than, and an arcuate dimension slightly greater than, that for the second arcuate section 28. Section 26 has a first pivoted end 30 and an opposite first slotted end 32. Similarly, the second arcuate section 28 has a second pivoted end 34 and a second slotted end 36.

Because the first arcuate section 26 has a curvature radius slightly less than, and an arcuate dimension slightly greater than, that of the second arcuate section 28, the first arcuate section 26 can intimately grip the outer periphery of a CV joint having a relatively small inboard circumference, and the second arcuate section 28 can alternatively intimately grip the outer periphery of a CV joint having a relatively large inboard circumference. The single clamp jaw 18 is thus alternatively usable to reliably remove CV joints of differing sizes.

Figure 3:
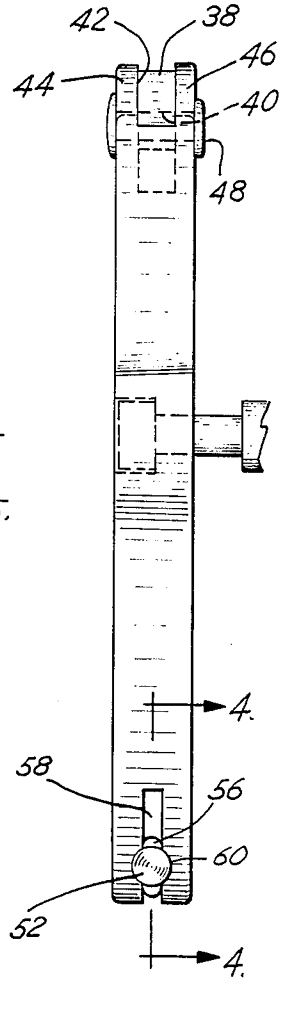
FIG. 3 is a side plan view of the axle clamp of the preferred embodiment.

As shown in FIG. 3, the first pivoted end 30 consists of a tongue 38 with a first pin passage 40 coaxial with the axis of the clamp jaw 18. The second pivoted end 34 has a slot 42 and a second pin passage 44 through both arms 44, 46 defining the slot 42. A pivot pin 48 extends through both the aligned first passage 40 and second pin passage 44 to secure the first pivoted end 30 to the second pivoted end 34 with the tongue 38 in the slot 42.

Referring back to FIG. 2, the first slotted end 32 includes an elongated slot 50 parallel to the plane defined by the arcuate members 26, 28. A removable bolt 52 having a key shaped end 56 and a threaded end 54, cooperates with the slots 56, 58.

Figure 4:
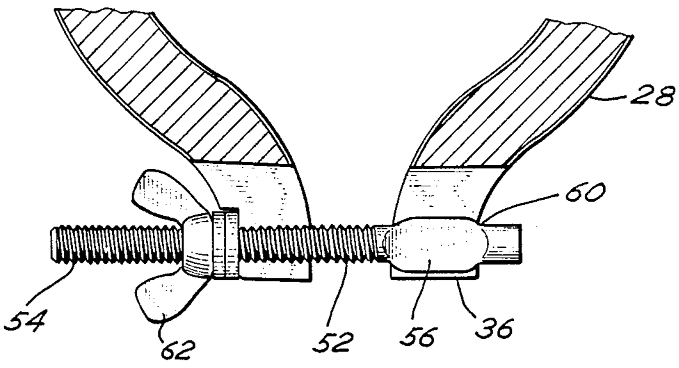
FIG. 4 is a sectional view of the axle clamp taken along section line 4—4 in FIG. 3.

Referring now to FIGS. 3 and 4, the key section 56 of the bolt 52 is substantially narrower than the diameter of shouldered end 60 of the bolt 52. With reference to FIG. 4, this shouldered end 60 abuts the outer periphery of the second slotted end 36 in the second arcuate section 28, and a wing nut 62 threaded on the threaded end 54 of the bolt 52 abuts the outer periphery of the first slotted end 32 of the first arcuate section 26.

Thus, referring back to FIG. 2, by threading the wing nut 62 on the threaded end 54 of the bolt 52, the first slotted end 32 rotates about the pivot pin 48 toward the second slotted end 36. In turn, the internal circumference of the entire clamp jaw 18 is reduced to clamp against an object, such as the inboard joint of the axle assembly 24 of FIG. 1, within the circumference of the clamp jaw 18. The clamp jaw 18, bolt 52, and wing nut 62 thus cooperate to accommodate, and securely clamp onto, axle assemblies 24 of differing dimensions.

Each arcuate section 26, 28 of the clamp jaw 18 also has a slotted shoulder 64, 66. The first slotted shoulder 64 is intermediate the first pivoted rod 30 and the first slotted end 32 on the first arcuate section 26, and the second slotted shoulder 66 is intermediate the second pivoted end 34 and second slotted end 36 on the second arcuate section 28. The first slotted shoulder 64 is also diametrically opposed to the second slotted shoulder 66 on the outer periphery of the clamp jaw 18.

Figure 5:
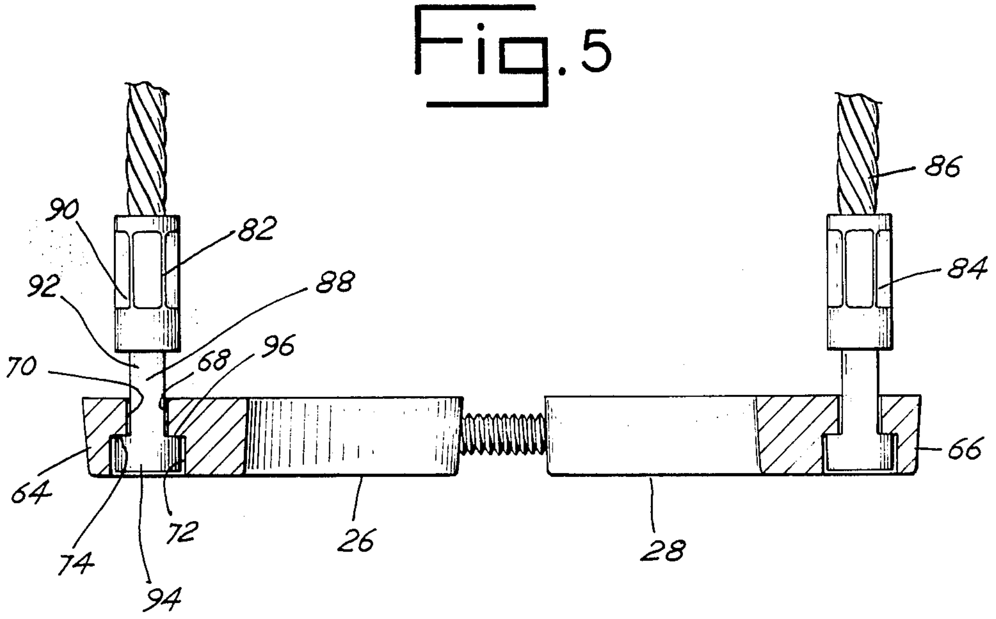
FIG. 5 is a sectional view of the axle clamp taken along section line 5—5 in FIG. 2.

Referring now to FIG. 5, the slotted shoulders 64, 66 are similarly formed. For example, the first slotted end 64 has a key passage 68 perpendicular to the plane of the clamp jaws and parallel to the axis of rotation of the arcuate sections 26, 28; and the key passage 68 has a narrowed portion 70 adjacent an enlarged portion 72. The juncture of the enlarged portion 72 and narrowed portion 70 thus defines a shoulder guide 74 in the key passage 68 perpendicular to the axis of the key passage 68.

As shown in FIG. 1, the flexible cable 16 has a first keyed pin 82 opposite the second keyed pin 84, and a flexible cable section 26 intermediate the keyed pins 2, 4. As shown in FIG. 5, the first and second keyed pins 82, 84 are removably retained in the first and second slotted shoulders 64, 66, respectively.

The two keyed pins 82, 84 are similarly formed. Thus, the first keyed pin 82 has a keyed shank 88 secured to the cable section 86 by a metal sleeve 90 crimped around the keyed shank 88 and cable section 86. Opposite the metal sleeve 90 on the keyed shank 88 is a narrowed keyway shank 92 abutting a pin head 94. The juncture of pin head 94 and the narrowed keyway shank 92 defines a fin shoulder 96 mateable with the shoulder guide 74 in the slotted shoulder 64. In this manner, tension force along the length of the cable section 86 is transferred through the keyed pin 90 to the slotted shoulder 64 as force along the axis of key passage 68 in the slotted shoulder 64.

Referring again to FIG. 1, the slide nut 14 has a threaded end 100 opposite a slide end 102. A cable passage 104 penetrates the slide end 102 transverse to the axis of threading in the threaded end 100.

The slide hammer has a handle end 110 opposite a threading end 112, and the threading end is mateable with the threaded end 100 of the slide nut 14.

The cable section 86 of the preferred embodiment is a steel cable. The remaining parts are fashioned from appropriate steel material.

It can thus be such that the improved embodiment provides an inexpensive, easily packaged tool for removing the axle assembly from a front wheel drive vehicle. The entire kit, absent the slide hammer, weighs relatively little and is easily packaged on a display card. Even with the slide hammer, the entire tool package requires substantially less space than tools in the prior art for this purpose.

The tool is also much easier to use than prior art tools. The operator simply raises the vehicle as he would with the prior art methods, but he need not struggle to insert a bar or v-clamp from the side of the car, around various wheel support structures, and ultimately between the axle assembly and transaxle case and around the axle itself to abut the axle assembly and pull on it. Instead, the operator simply walks under the car and clamps the clamp jaw 18 in place on the axle assembly 24, then inserts the keyed pins 82, 84 of the cable 16 in their respective slotted shoulders 64, 66 in the clamp jaw 18, and backs away toward the side of the vehicle with the flexible cable section 86 or slide nut 14 in hand. Upon securing the slide hammer 12 to the slide nut 14 on the cable 16, the operator then easily tensions the cable 16 and rams the slide hammer 12 to force the clamped axle assembly 24 away from the transaxle case 22 in the direction of the operator on the side of the car. The tool 10 is thus much easier to use than the tools in the prior art, while also being less expensive, less bulky, and easier to manufacture. The tool 10 is also usable to remove axle assemblies having differing sizes of inboard joints.

While in the foregoing there has been a detailed description of the preferred embodiment, the scope of the invention is measured by the following claims rather than the detailed description.

What is claimed is:

1. An improved tool for pulling an axle assembly from a transaxle case on front wheel drive vehicles, comprising in combination:

(a) a length of flexible cable having opposite ends;

(b) clamp means for clamping onto the axle assembly;

(c) attaching means for attaching the opposite ends of the flexible cable to the clamping means; and (d) tensioning means intermediate the ends of the cable, the tensioning means including (1) a slide hammer with a handle end and an attachment end, and (2) a slide nut having a cable passage for receipt of the flexible cable and an attachment portion for interlocking receipt of the attachment end of the slide hammer.

2. The improved axle puller of claim 1 wherein the clamping means includes a first arcuate member and a second arcuate member, said arcuate members being pivotally connected together at one end and releasably connected together at the opposite end to form a closed, continuously curved member for placement onto, and clamping of, the axle assembly.

3. The improved tool of claim 2 wherein (i) the attaching means includes a first slotted shoulder on the first arcuate member and a second slotted shoulder on the second arcuate member, and (ii) the flexible cable includes a first keyed pin at one end and a second keyed pin at the other end, the first keyed pin being slidably securable in the first slotted shoulder and the second keyed pin being slidably securable in the second slotted shoulder.

4. The improved tool of claim 2 wherein the first arcuate member has a radius of curvature less than, and an arcuate length greater than, the respective radius of curvature and arcuate length of the second arcuate member.

5. The improved tool of claim 3 wherein the first slotted shoulder is intermediate the ends of the second arcuate member and the first and second arcuate sections are connected to form the closed, continuously curved member.

6. An improved tool for pulling an axle assembly from a transaxle case on front wheel drive vehicles, comprising in combination:

(a) a length of flexible cable having opposite ends:

(b) clamp means including a first arcuate member and a second arcuate member, the arcuate members being pivotally connected together at one end and releasably connected at the opposite end to form a closed, continuously curved member, wherein the first arcuate member has a radius of curvature less than, and an arcuate length greater than, the respective radius of curvature and arcuate length of the second arcuate member:

(c) attaching means for attaching the opposite ends of the flexible cable to the clamping means; and (d) means for tensioning the cable intermediate the ends to transmit force to the clamping means and thereby separate the axle assembly from the transaxle case.

7. The improved axle puller of claim 6 where the tensioning means includes (1) a slide hammer with a handle end and an attachment end, and (2) a slide nut having a cable passage for receipt of the flexible cable and an attachment portion for interlocking receipt of the attachment end of the slide hammer.

8. The improved tool of clamp 6 wherein (1) the attaching means includes a first slotted shoulder on the first arcuate member and a second slotted shoulder on the second arcuate member, and (2) the flexible cable includes a first keyed pin being slidably securable in the first slotted shoulder and a second keyed pin being slidably securable in the second slotted shoulder.

9. The improved tool of claim 8 wherein the first slotted shoulder is intermediate the ends of the first arcuate member, the second slotted shoulder is intermediate the ends of the second arcuate member, and the first and second slotted shoulders are diametrically opposed when the first and second arcuate members are connected to form the closed, continuous curved members.

* * * * *